United States Patent [19]
Mainwal

[11] Patent Number: 5,904,392
[45] Date of Patent: May 18, 1999

[54] MOTORCYCLE CANOPY

[76] Inventor: Leo Mainwal, 3337 Fandanso Pl., Las Vegas, Nev. 89102

[21] Appl. No.: 09/027,139

[22] Filed: Feb. 20, 1998

[51] Int. Cl.[6] .................. B60J 7/08; B62J 17/06
[52] U.S. Cl. ............. 296/78.1; 296/180.1; 180/219; 280/288.4
[58] Field of Search ............. 296/78.1, 180.1; 180/219; 280/727, 288.4

[56] References Cited

U.S. PATENT DOCUMENTS

| | | |
|---|---|---|
| D. 245,838 | 9/1977 | Messinger . |
| D. 355,403 | 2/1995 | Eberle . |
| 582,070 | 5/1897 | Lester . |
| 1,342,987 | 6/1920 | Chimino . |
| 1,357,239 | 11/1920 | Krok . |
| 1,616,126 | 2/1927 | Jacobson . |
| 1,877,609 | 9/1932 | Stern et al. . |
| 3,284,130 | 11/1966 | Michael ................... 296/78.1 |
| 3,301,589 | 1/1967 | Hayden . |
| 3,328,073 | 6/1967 | Einhorn ................... 296/136 |
| 3,979,147 | 9/1976 | Kelley . |
| 4,066,291 | 1/1978 | Hickman . |
| 4,336,964 | 6/1982 | Pivar . |
| 4,440,436 | 4/1984 | Giddens et al. ............ 296/78.1 X |
| 4,560,196 | 12/1985 | Carter, Sr. . |
| 4,632,448 | 12/1986 | Yagasaki et al. . |
| 4,681,362 | 7/1987 | Taylor ................... 296/78.1 |
| 4,973,082 | 11/1990 | Kincheloe .............. 296/78.1 X |
| 5,058,943 | 10/1991 | Louderback . |
| 5,072,987 | 12/1991 | Allen .................. 296/78.1 X |
| 5,458,390 | 10/1995 | Gilbert ................. 296/78.1 |
| 5,684,388 | 11/1997 | Bothwell et al. ........ 296/78.1 X |

*Primary Examiner*—Joseph D. Pape
*Attorney, Agent, or Firm*—Quirk & Tratos

[57] ABSTRACT

A canopy for a motorcycle is set forth which includes a rigid shell with a top portion to project over the driver and passenger and panels extending from the top portion to be connected to the motorcycle. Inwardly directed deflection surfaces are defined at the forward edges of the panels to direct air flow around the shell for the comfort of the driver and passenger.

4 Claims, 4 Drawing Sheets

5,904,392

MOTORCYCLE CANOPY

FIELD OF THE INVENTION

The present invention relate to canopies and covers for motorcycles and the like.

BACKGROUND OF THE INVENTION

Modern touring motorcycles are built to provide comfort for touring over long distances. Because of the power and comfort, couples can ride together, seated one behind the other, and experience the open air, freedom and excitement of motorcycle touring. Often these touring motorcycles are fitted with radios, cellular telephones, compact disc players and the like to enhance the touring experience.

A drawback related to touring is that the driver and passenger seated behind the driver are open to the elements of sun and rain. While the open riding of a motorcycle where the riders are not located in a closed compartment such as that offered by an automobile is part and parcel of the riding experience, rain, hail and sun can detract from this experience. It would be advantageous to provide a degree of protection for the elements while maintaining the open air environment of motorcycle riding.

A further drawback is that the passenger seated behind the driver, because of the sound of the wind flowing past the motorcycle which may be traveling at speeds of 70 mph, has difficulty conversing with the driver or hearing the radio. It would be advantageous to provide a means to attenuate at least to a degree the noise imposed upon the passenger and driver.

Still a further drawback is that there is little storage space available on a motorcycle. Providing additional storage space while addressing the drawbacks noted above would be advantageous.

In the past, some of the drawbacks and concerns described above have been addressed by providing complete enclosures for the motorcycle driver and passenger as set forth in, for example, U.S. Pat. No. 5,458,390 issued Oct. 17, 1995 to Gilbert, U.S. Pat. No. 3,979,147 issued Sep. 7, 1976 to Kelley, U.S. Pat. No. 4,560,196 issued Dec. 24, 1995 to Carter, Sr.. However these complete covers effect the stability of the motorcycle particularly where the riders experience gusts of wind from the side as those imposed by weather and by passing vehicles, particularly large vehicles such as tractor-trailer rigs. The full side surfaces of such covers provide a large area for the gusts to act upon.

Partial covers have also been developed such as those shown in U.S. Pat. No. 4,440,436 issued Apr. 3, 1984 to Giddens, et al, U.S. Pat. No. 5,072,987 issued Dec. 17, 1991 to Allen. While providing some protection and reducing the side area available for gust and wind imposed forces, these covers are not adapted to reduce noise effects nor contribute to the overall aerodynamic shape for the motorcycle.

It therefore would be desirable to provide a partial canopy for the driver and passenger which overcomes these drawbacks.

SUMMARY OF THE INVENTION

Toward this end a canopy for a motorcycle is set forth which includes a rigid shell adapted to extend from the upper terminus of the motorcycle windscreen rearwardly relative to the motorcycle to cover the tandem driver and passenger positions on the motorcycle. The shell includes right and left panels which extend downwardly from the top to a bottom margin therefor. Means are provided for attaching the shell to the motorcycle as by securing the shell to the upper terminus of the windscreen and the panel bottom margins to the motorcycle frame. As attached to the motorcycle the shell defines a compartment open at the sides proximate the driver's position, closed by the panels proximate the passenger's position and open at the rear. The open sides and rear provide the open air environment desired by motorcycle riders and reduce the side surface areas presented to side wind imposed forces. Disposed at the forward margins of the panels are deflection surfaces adapted to, in cooperation with at least the windscreen, deflect and direct wind past the open sides and around to outside of the panels. This deflection induces the airflow streamlines to define to the extent possible an air dam at the open sides which contributes to the aerodynamic shape of the overall motorcycle as well as reduce the noise imposed upon the driver and passenger. It has been found that the aforementioned configuration enables the driver and passenger to more easily converse and for the passenger to hear the radio.

The inside surface of the canopy also provides a convenient structure to provide for additional storage on the motorcycle.

Preferably, the shell has a roof or top portion which is ellipsoidal in shape in the lateral dimension and arcuate in the longitudinal dimension and is fashioned from fiberglass to reduce the weight of the canopy.

BRIEF DESCRIPTION OF THE DRAWINGS

These and other features and advantages will become appreciated as the same becomes better understood with reference to the specification, claims and drawings wherein:

DESCRIPTION

Figure 1:
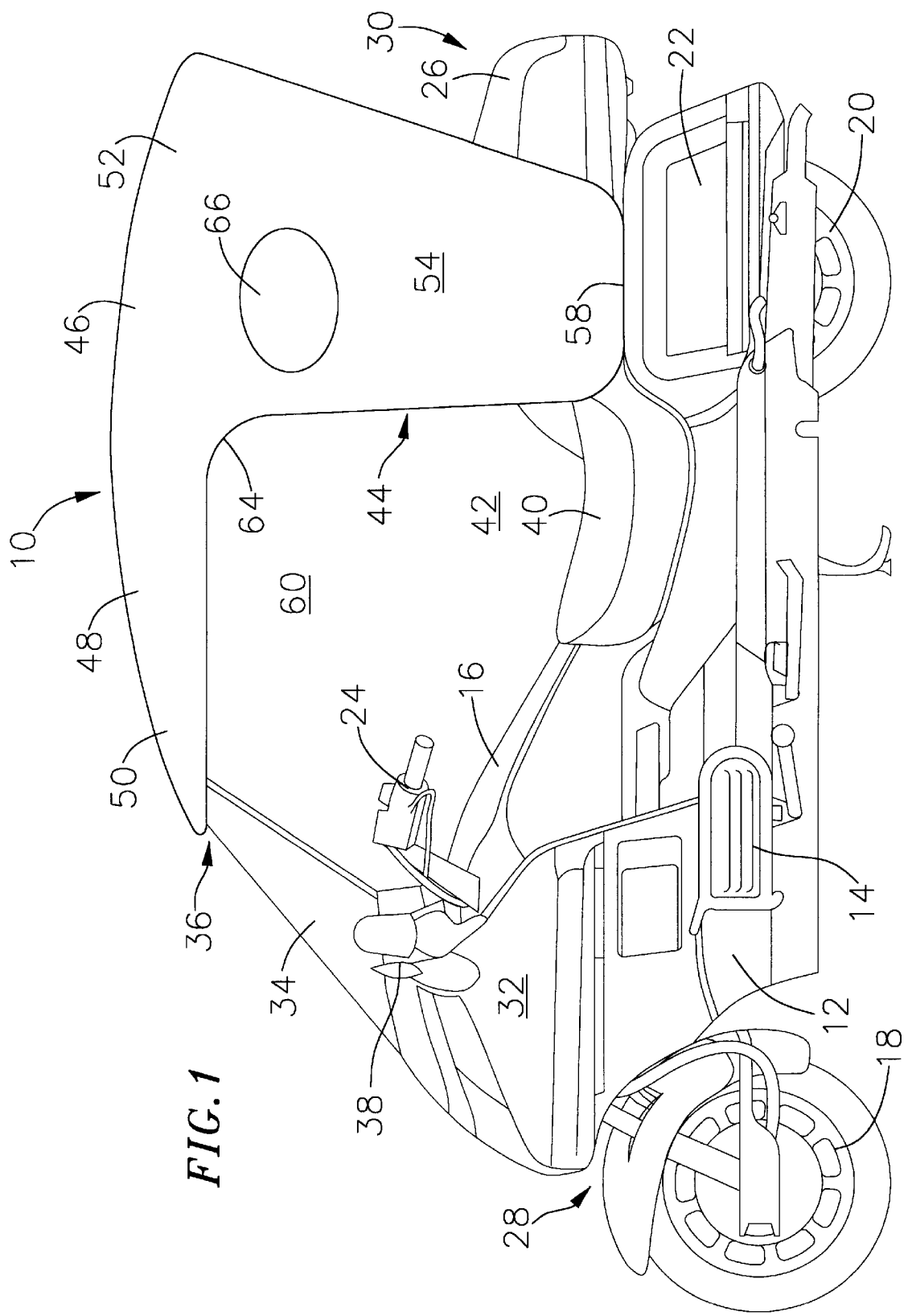
FIG. 1 is a side view of the canopy attached to a touring motorcycle.

Turning to the drawings, FIG. 1 shows a canopy 10 according to the present invention attached to a typical motorcycle 12. With reference to the motorcycle 12, the motorcycle includes a frame which supports components such as the power plant or engine 14, fuel tank 16, front and rear wheels 18, 20 saddlebags 22, handlebars 24 and rear storage container 26. As is well known, these components define a front 28 and rear 30 for the motorcycle 10. At the front 28 of the motorcycle 10, the typical touring motorcycle includes a front faring 32 which may integrally mount a windscreen 34 which extends from the faring 32 to have an upper terminus 36. As is typical with touring motorcycles, the faring 32 also includes rear view mirrors 38.

With continuing reference to FIG. 1, the typical motorcycle 12 as shown in FIG. 1 also includes a seat 40 to the rear of the fuel tank 16 which extends rearwardly to define a driver's and a passenger's position 42, 44 on the motorcycle 10. As illustrated, the passenger sits behind the driver in a tandem fashion.

The remaining components of the typical motorcycle 12 are well-known to those skilled in the art and therefore will not be described further herein.

Figure 2:
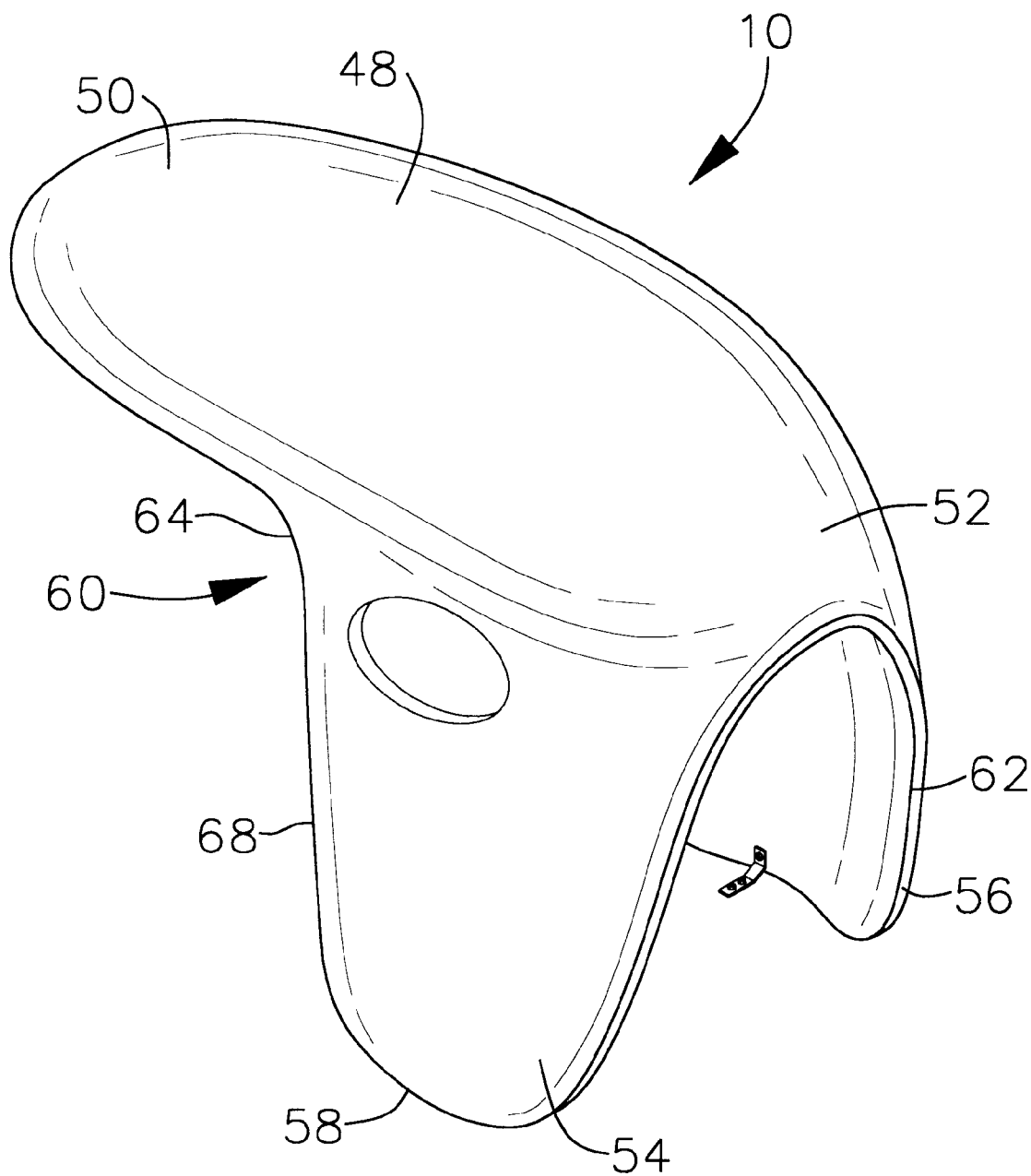
FIG. 2 is a top-side-rear perspective view of the canopy.
Figure 4:
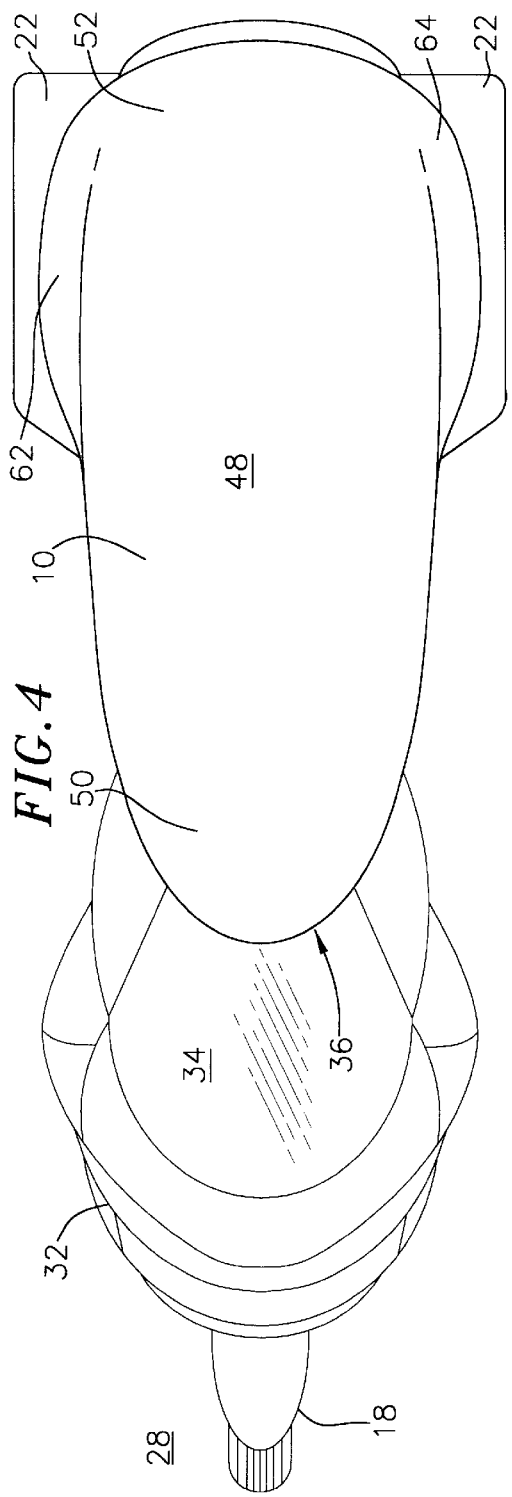
FIG. 4 is a top view of the canopy and motorcycle.
Figure 5:
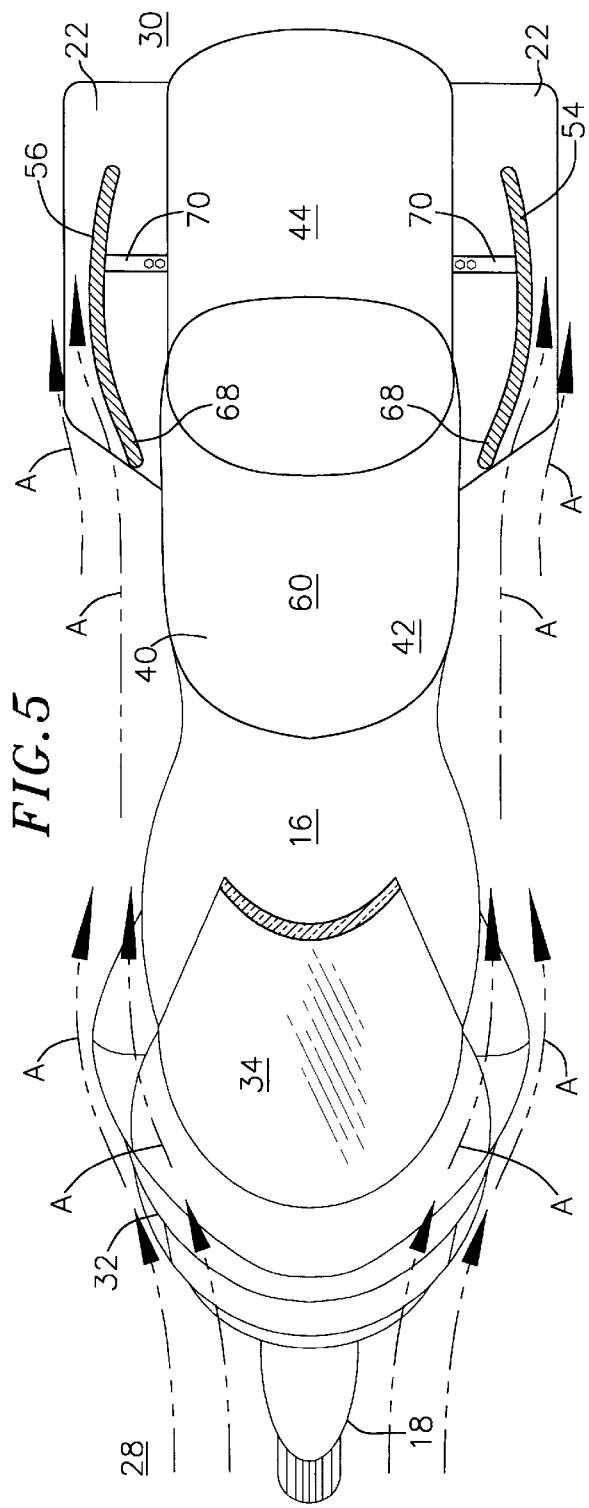
FIG. 5 is a cut away partial top view of the canopy and motorcycle illustrating the direction of airflow past the motorcycle and canopy.

With reference to FIGS. 1, 2 and 5, the canopy 10, which preferably is molded as a one-piece rigged shell 46 from fiberglass or other suitable, lightweight material has a top portion 48 which extends from a position preferably closely adjacent to the windscreen upper terminus 36 rearwardly to a position to cover the driver and passenger positions 42, 44. Viewing the top portion 48 from a top plan view as shown in FIG. 4, it is seen that the top portion 48 has a truncated elliptical shape and from the side is arcuate to define an ellipsoidal configuration. It is to be understood that the top portion 48 could instead be flat or any other desired configuration. The top portion 48 defines a forward segment 50 adapted to cover the driver's position 42 and a rear segment 52 adapted to cover the passenger's position 44.

Figure 3:
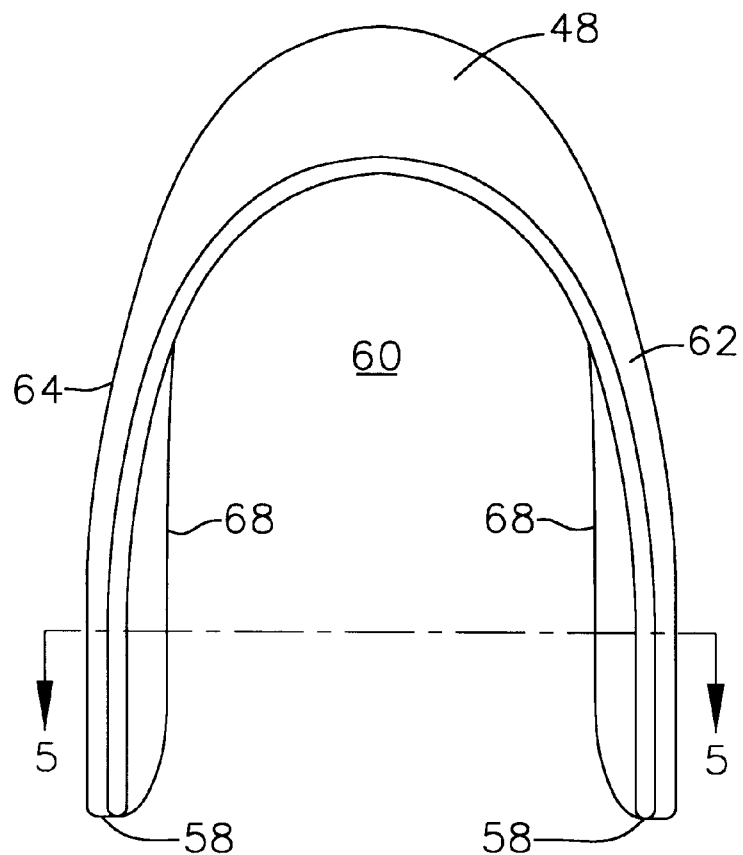
FIG. 3 is a rear view of the canopy.

Depending from the top portion rear segment 52 the shell includes right and left panel portions 54, 56. Each of the panel portions 54, 56 depend from the top portion rear segment 52 to, as shown in FIG. 1, define bottom margins 58 for the panel portions 54, 56. As secured to the motorcycle 12 as shown in FIGS. 1 and 5, the shell 46 defines a compartment 60 for the driver and passenger's positions 42, 44. The compartment 60 is closed on the sides proximate the passenger's position 44 by the right and left panel portions 54, 56 but at the rear, as best shown in FIGS. 3 and 5 is open defining a rear opening 62 for the compartment 60. Returning to FIGS. 1 and 2, it is seen that fillets 64 provide a smooth, arcuate transition from the top portion to the panel portions 54, 56 and that the panel portions 54, 56 converge, when viewed from the side, from the top portion 48 to their bottom margins 58. For a Honda, Gold Wing™ motorcycle, the right and left panel portions 54, 56 have an approximate width at the juncture with the top portion of approximately 37 inches to 40 inches and converge to bottom margins 58 having approximately the dimensions of 13 inches to 15 inches. The top portion 48 of the shell 46 has an overall front to rear length of approximately 67 inches and a maximum height, relative to the bottom margins 58 of approximately 43 inches. As shown in FIG. 3, the top portion 48 of the shell 46 is arcuate in a rear to front view having a radius of curvature of approximately 24 inches. As is further seen, the right and left panel portions 54, 56 flare outward as they depend from the top portion 48 for approximately two-thirds of their length and thereafter extend vertically and parallel terminating at the bottom margins 58. Depending upon the configuration of the motorcycle 12, the spacing between the right and left panel portions 54, 56 at the bottom margins may be in the range of 25 inches or the like.

To provide for viewing by the passenger seated in the passenger's position 44, the shell 46 includes in each of the right and left panel portions 54, 56 a porthole 66 which may include glass or acrylic and may be tinted or clear as desired.

To deflect air, each of the right and left panel portions 54, 56 includes at their forward edges, inwardly directed deflection surfaces 68 as best shown in FIGS. 2, 3 and 5. These deflection surfaces 68 may have a width at the bottom margins 58 of approximately 8 inches gradually tapering to merge with the surface of the panel portions 54, 56 proximate the fillets 64. Relative to the size of the panel portions 54, 56, these deflection surfaces 68 proximate the bottom margins 58 may extend inwardly proximately 4 inches. Depending upon the overall desired configuration of the shell 46, the aforesaid dimensions of the deflection surfaces 68 may vary.

As shown in FIG. 5, it has been found that, in cooperation with the windscreen 34 and front faring 32, if any, the defection surfaces 68 are adapted to direct airflow around the shell 46 and compartment 60 defined thereby as suggested by the airflow arrows A. As suggested by arrows A, airflow as the motorcycle moves at highway speeds, is directed around the windscreen 34 but before it can converge on what would be the passenger's position 44, the deflection surfaces 68 deflect the airflow around the compartment 60 to outside of the shell 46. This effect produces several advantages. One advantage is that it reduces the noise and wind imposed at both the driver and passenger positions 42, 44 as the motorcycle moves at highway speeds. It has been found that the passenger seated at the passenger's position 44 can hear the driver talk and can hear the radio for the motorcycle 12 which is usually disposed at the front 28 of the motorcycle. At these touring speeds, where the forces of the wind and the noise created thereby are most felt, the deflection surfaces 68 in cooperation with the windscreen 34 and front faring 32 direct the airflow and the arrows A to in effect, encapsulate the driver and passenger in the envelope of air passing around the motorcycle. Because the effects of wind and noise are reduced, the driver and passenger are more comfortable operating at touring speeds.

A further advantage is that the deflection surfaces particularly at highway speeds urge the airflow in the pattern suggested in FIG. 5 defining a streamlined configuration for the motorcycle and canopy 10. Thus the canopy 10 does not significantly contribute to reduction of gas mileage and it is believed will increase mileage over a like motorcycle operating without the canopy 10.

The aforementioned advantages do not significantly effect the wind stability of the motorcycle 12 and canopy 10. Because of the openings defined by the configuration of the canopy 10, side directed gusts of wind have a path to pass through the compartment 60 and therefore the canopy 10 does not present a significant side surface normal to the side gusts which could effect the stability of the motorcycle 12 and canopy 10.

Figure 6:
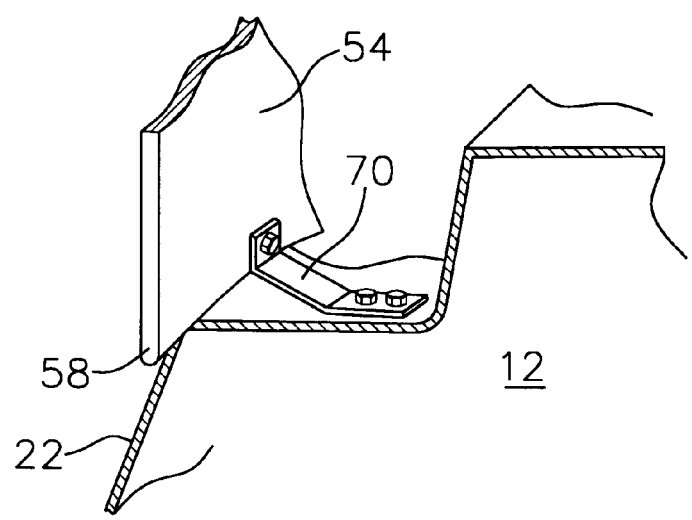
FIG. 6 is partial perspective view of portions of the canopy showing attachment to the motorcycle.

With reference to FIG. 6, suitable means are provided for securing the canopy 10 to the motorcycle 12. One or more brackets 70 are secured between the motorcycle frame and the canopy bottom margins 58. At the front of the motorcycle, fasteners secure the canopy 10 to the windscreen 34. To remove the canopy, the user need only disconnect the brackets 70 and fasteners.

As can be appreciated, the canopy 10 for the motorcycle 12 will enhance the touring experience of the driver and passenger. The driver and passenger are not subject to constant battering by wind and wind noise which can be tiring on long trips. Furthermore, the driver and passenger can more easily communicate in the absence of the wind noise.

As a further feature, the canopy 10 may be provided with pockets and receptacles for storage of papers, water bottles, maps and the like for which easy access is preferred during touring.

Still further, the canopy 10 does not detract from the open-air feeling created by motorcycle touring. The driver has the openings to either side as well as at the rear opening 62. The passenger also has a view through the side openings and rear opening 62 as well as through the portholes 66.

While I have described certain advantages and features of the present invention it is to be understood that it is subject to many modifications and changes without departing from the spirit and scope of the invention set forth in the appended claims.

I claim:

1. A canopy for a motorcycle having a driver's position, a passenger position behind the driver's position, a frame and a front windscreen secured to the frame and projecting upwardly from the forward end of the motorcycle in front of the handlebars therefor, the canopy comprising:

a rigid shell having a top portion adapted to extend from the upper terminus of the windscreen rearwardly to a rear position to cover the driver and passenger positions, said top portion having a forward and rear segment and right and left panel portions each adapted to extend downwardly from the top portion rear segment to a bottom margin;

means for connecting the shell to the frame to define a compartment for the driver and passenger positions, said compartment open on the sides proximate the driver's position, closed at the sides proximate the passenger position by said panels and open at the rear; and inwardly directed deflection surfaces defined at the forward margins of the panels adapted to direct the flow of air to the outside of the panel portions and away from the compartment.

2. The canopy of claim 1 including means for releasably connecting the shell to the frame.

3. The canopy of claim 1 further including a window in at least one of the panel portions adapted to provide for passenger viewing from the shell.

4. A canopy for a motorcycle having a driver's position, a passenger position behind the driver's position, a frame and a front windscreen secured to the frame and projecting upwardly from the forward end of the motorcycle in front of the handlebars therefor, the canopy comprising:

a rigid shell having
  (i) an ellipsoidal top portion adapted to extend from the upper terminus of the windscreen rearwardly to a rear position to cover the driver and passenger positions, said top portion having a forward segment adapted to cover the driver's position and rear segment adapted to cover the passenger's position,
  (ii) right and left panel portions each adapted to extend downwardly from the top portion rear segment to a bottom margin;

means for connecting the shell to the frame to define a compartment for the driver and passenger positions, said compartment open on the sides proximate the driver's position and at the rear, said panels adapted to close the sides of the compartment proximate the passenger position; and inwardly directed deflection surfaces defined at the forward margins of the panels adapted to direct the flow of air around the outside of the shell.

\* \* \* \* \*